US006576597B2

(12) United States Patent
Dobson, Jr. et al.

(10) Patent No.: US 6,576,597 B2
(45) Date of Patent: Jun. 10, 2003

(54) METHOD OF INCREASING THE LOW SHEAR RATE VISCOSITY AND SHEAR THINNING INDEX OF DIVALENT CATION-CONTAINING FLUIDS AND THE FLUIDS OBTAINED THEREBY

(75) Inventors: James W. Dobson, Jr., Houston, TX (US); Kim O. Tresco, Houston, TX (US)

(73) Assignee: Texas United Chemical Company, LLC., Houston, TX (US)

( * ) Notice: Subject to any disclaimer, the term of this patent is extended or adjusted under 35 U.S.C. 154(b) by 0 days.

(21) Appl. No.: 09/970,831

(22) Filed: Oct. 4, 2001

(65) Prior Publication Data

US 2002/0028750 A1 Mar. 7, 2002

Related U.S. Application Data

(63) Continuation-in-part of application No. 09/806,752, filed on Apr. 2, 2001, now Pat. No. 6,391,830, which is a continuation-in-part of application No. 09/368,947, filed on Aug. 5, 1999, now Pat. No. 6,300,286.

(51) Int. Cl.$^7$ .................................................. C09K 7/02

(52) U.S. Cl. ..................... 507/111; 507/140; 507/145; 507/212; 507/269; 507/272; 507/277; 507/906; 507/925

(58) Field of Search .................... 507/111, 140, 507/145, 212, 269, 272, 277, 906, 925

(56) References Cited

U.S. PATENT DOCUMENTS

| 3,878,110 | A | * | 4/1975 | Miller et al. ................. 507/111 |
| 4,175,042 | A | * | 11/1979 | Mandshine .................. 507/140 |
| 4,427,556 | A | * | 1/1984 | House et al. ................ 507/140 |
| 4,822,500 | A | * | 4/1989 | Dobson, Jr. et al. ......... 507/111 |
| 5,514,644 | A | * | 5/1996 | Dobson ...................... 507/111 |
| 5,576,271 | A | * | 11/1996 | Patel .......................... 507/111 |
| 5,612,293 | A | * | 3/1997 | Swartwout et al. .......... 507/212 |
| 5,616,541 | A | * | 4/1997 | Dobson, Jr. et al. ......... 507/145 |
| 5,641,728 | A | * | 6/1997 | Dobson, Jr. et al. ......... 507/111 |
| 5,783,527 | A | * | 7/1998 | Dobson, Jr. et al. ......... 507/269 |
| 5,804,535 | A | * | 9/1998 | Dobson et al. .............. 507/111 |
| 6,300,286 | B1 | * | 10/2001 | Dobson, Jr. et al. ......... 507/111 |
| 6,391,830 | B1 | * | 5/2002 | Dobson, Jr. et al. ......... 507/111 |
| 6,420,319 | B1 | * | 7/2002 | Estes et al. ................. 507/209 |

* cited by examiner

Primary Examiner—Philip Tucker
(74) Attorney, Agent, or Firm—Roy F. House

(57) ABSTRACT

Disclosed is a method of increasing the low shear rate viscosity and the shear thinning index of aqueous fluids containing a divalent cation salt, a crosslinked amylopectin starch which functions as both a viscosifier/suspending agent and as a fluid loss control additive, and a bridging agent, the fluids resulting from the method, and the use of the fluids in drilling a well, wherein the bridging agent is a sized particulate magnesium carbonate or a mixture of sized magnesium carbonate and sized calcium carbonate. The median ($D_{50}$) particle size of the magnesium carbonate is from about 2 μm to about 10 μm. The weight ratio of calcium carbonate to magnesium carbonate is from about 70/30 to about 0/100.

72 Claims, No Drawings

METHOD OF INCREASING THE LOW SHEAR RATE VISCOSITY AND SHEAR THINNING INDEX OF DIVALENT CATION-CONTAINING FLUIDS AND THE FLUIDS OBTAINED THEREBY

This patent application is a continuation-in-part of patent application Ser. No. 09/806,752 filed Apr. 2, 2001, now U.S. Pat. No. 6,391,830 which is a continuation-in-part of patent application Ser. No. 09/368,947 filed Aug. 5, 1999, now U.S. Pat. No. 6,300,286 each incorporated herein by reference.

BACKGROUND OF THE INVENTION

The present invention relates to clay-free aqueous well drilling and servicing fluids, methods of preparation thereof, and method of drilling a well therewith.

The use of fluids for conducting various operations in the boreholes of subterranean oil and gas wells which contact a producing formation are well known. Thus drill-in fluids are utilized when initially drilling into producing formations. Completion fluids are utilized when conducting various completion operations in the producing formations. Workover fluids are utilized when conducting workover operations of previously completed wells.

The new reservoir drilling fluid system set forth in copending patent application Ser. No. 09/806,752 filed Apr. 2, 2001 and further disclosed in the Society of Petroleum Engineer's paper SPE 68965 entitled "A New Biopolymer-Free Low-Solids, High Density Reservoir Drilling Fluid," hereinafter sometimes referred to as "NBRDF," utilizes a non-biopolymer, acid- or enzyme-soluble starch derivative that serves both as viscosifier and fluid-loss additive when combined with activated magnesium oxide and a divalent-cation-based brine. The NBRDF shows a unique shear-thinning Theological profile featuring relatively low, high-shear-rate viscosity along with relatively high, low-shear-rate viscosity. This behavior is highly unusual in high-density, brine-based reservoir drilling fluids. A result of this behavior is that effective hole cleaning is provided without generating excessive high-shear-rate viscosities that lead to disproportionate equivalent circulating densities. The NBRDF system is based on the higher density, divalent-cation-containing brines (utilizing $CaCl_2$, $CaBr_2$, $Ca\,Cl_2/Ca\,Br_2$, $Zn\,Br_2/Ca\,Br_2$ and $Zn\,Br_2/Ca\,Br_2/Ca\,Cl_2$) in the 10.0 to 17.5 lb/gal density range, containing at least 1.2 equivalents per liter of a divalent cation salt. The total amount of the sized $CaCO_3$ bridging particles is kept relatively low, 13 to 35 lb/bbl, so that thin, chemically removable filter cakes are produced. The size distribution of these bridging particles is designed according to the ideal packing sequence for optimizing sealing and producing a minimally invading (well productivity enhancing) fluid.

A number of technical advances in the petroleum industry have created cost-effective methods for the exploration and development of deep oil and gas reservoirs. One result of these developments is an increased demand for higher density reservoir drilling fluids (RDF's). However, the density attainable for economically viable, brine-based reservoir drilling fluids is limited under current technology. Some limitations are based on the fact that current biopolymer-$CaCO_3$-brine-based reservoir drill-in fluids utilize viscosifiers that are either incompatible with the higher-density brines of require special mixing equipment/techniques and complex formulations. In other cases, the cost of a base brine compatible with currently available biopolymer viscosifiers is such that the final drill-in fluid is priced out of consideration. The invention set forth in copending patent application Ser. No. 09/806,752 filed Apr. 2, 2001 present a newly developed biopolymer-free fluid system that uses conventional high-density base brines to fulfill the density requirement, a low concentration of bridging-solids, and a pre-gelatinized epichlorohydrin crosslinked amylopectin starch which functions as a viscosifier and fluid loss additive to produce an easily blended drill-in fluid with exceptional rheological and filter cake qualities.

Most brine-based reservoir drilling fluid systems used today consists of five primary components: base brine, pH control additive, biopolymer-derived viscosifier, starch-based fluid-loss additive, and bridging particles. Containing no biopolymers, such as xanthan gum or scleroglucan, the NBRDF system uses a pre-gelatinized epichlorohydrin crosslinked amylopectin starch (hereinafter sometimes referred to as "XLAPS") that fulfills the role of both viscosifier and fluid-loss additive when combined with a divalent-cation-based brine and a highly activated magnesium oxide. This fluid delivers a unique shear-thing Theological profile that provides effective hole-cleaning without generating excessive high-shear-rate viscosities that lead to disproportionate equivalent circulating densities.

The NBRDF is based on the higher density, divalent-cation-containing brines in the 10.0 lb/gal to 17.5 lb/gal density range. Brine-based fluids based on calcium chloride, calcium bromide, and zinc bromide brines provide several advantages. Formulating RDF systems in heavier brines minimizes the solids concentration required to weight-up to a high density. Keeping the solids low results in a lowering of the plastic viscosity. Buoyancy, or the upward pressure exerted by a fluid against particulates in the fluid, reduces the demands upon the viscosifying additives for particle suspension and cuttings removal.

A primary component of the NBRDF is the matrix of sized $CaCO_3$ particles, the total amount of which is kept relatively low, 10 to 50 lb/bbl, so that thin lubricious, and easily removed filter cakes are produced. The size distribution making up this matrix of $CaCO_3$ particles is designed according to the ideal packing sequences for optimizing sealing. This approach is designed to minimize formation damage by forming a thin, ultra-low permeability and high durability filter cake on the face of the formation, thereby minimizing fluid and solids invasion into the formation.

The relatively high low-shear-rate viscosities is a significant point of departure between the new NBRDF system and conventional $CaCO_3$-biopolymer-based RDF's in high calcium or zinc environments. Most other brine-based RDF's incorporate both a starch and a biopolymer like xanthan or schleroglucan. Inasmuch as most of the fluid's viscosity is only achieved when the biopolymer is added, dispersed, hydrated, and fully yielded, the biopolymer is termed a viscosifier. The starch is termed a fluid-loss additive inasmuch as the formulations without starch seldom have more than marginal fluid-loss-control character.

The new NBRDF system relies solely on the XLAPS to serve both roles of viscosifier and fluid-loss-control agent. This characteristic alone distinguishes the XLAPS as an unusual starch. XLAPS performs well in brines based on $CaCl_2$, $CaBr_2$, $Ca\,Cl_2/CaBr_2$, $Zn\,Br_2/Ca\,Br_2$ and $Zn\,Br_2/Ca\,Br_2/Ca\,Cl_2$; but in seawater, NaCl-based and NaBr-based brines, XLAPS does not exhibit much capability as a viscosifier.

The NBRDF system is not intolerant of the addition of monovalent cation salts, like NaCl and NaBr, as long as the addition does not dilute the divalent cation concentration below about 1.2 equivalents per liter. Therefore, little or no difficulty is anticipated in drilling through salt.

In the NBRDF at lower densities and even as high as 14.0 lb/gal, higher low-shear-rate viscosities are consistently developed with the addition of small increments of a highly reactive magnesium oxide (HRMgO), a pH control agent, and/or dipotassium hydrogen phosphate. The suggestion that a pH control additive could be contributing viscosity is quite surprising, especially when it is noted that adding HRMgO and/or dipotassium hydrogen phosphate tends especially to enhance the fluids apparent viscosity at 0.0636 $sec^{-1}$ shear rate (LSRV), while having minimal effect on the fluid's viscosity at high shear rates.

A further distinction between the viscosifying characteristics of the new NBRDF and conventional RDF's is the ratio $LSRV/AV_{600}$. The commonly used parameter $AV_{600}$ is one-half of the 600-rpm reading on a Fann 35 viscometer. $AV_{600}$ is thus the apparent viscosity measured at 600 rpm, i.e., at the relatively high shear rate of 1022 $sec^{-1}$. The $LSRV/AV_{600}$ ratio is sometimes referred to as the shear-thinning index (STI). This parameter is dimensionless because both $AV_{600}$ and LSRV are measured in the same units (cP). A desirable RDF viscosity profile would be to have a high value of LSRV and a low value of $AV_{600}$. High LSRV gives good drill solids suspension and hole-cleaning character. Low $AV_{600}$ permits low pressure losses in the drill pipe. The result of these low pressure losses is the transmission of as much of the hydraulic energy in the pumped fluid to the drill bit as possible without running the risk of hydraulically fracturing the formation. These considerations suggest that high $LSRV/AV_{600}$ ratios are desirable in RDF's.

SUMMARY OF THE INVENTION

We have now found that the LSRV and STI of the NBRDF system can be significantly increased by utilizing for the bridging agent sized magnesium carbonate particles or a mixture of sized magnesium carbonate particles and sized calcium carbonate particles. The medium particle size ($D_{50}$) of the magnesium carbonate particles is from about 2 μm to about 10 μm, and the $D_{50}$ of the sized calcium carbonate particles is from about 2 μm to about 10 μm. The mixture of magnesium carbonate and calcium carbonate particles can contain from about 30% to about 100% by weight of the sized magnesium carbonate particles and from about 0% to about 70% by weight of the sized calcium carbonate particles.

Thus it is an object of the invention to provide a method of increasing the low shear rate viscosity and the shear thinning index of an aqueous fluid containing at least 1.2 equivalents per liter of a water soluble divalent cation salt and from about 5 ppb to about 12 ppb of a pre-gelatinized crosslinked amylopectin starch which comprises adding to the aqueous fluid a particulate sized magnesium carbonate bridging agent having a median particle size from about 2 micrometers to about 10 micrometers.

It is another object of the invention to provide a method of increasing the low shear rate viscosity and the shear thinning index of an aqueous fluid containing at least 1.2 equivalents per liter of a water soluble divalent cation salt and from about 5 ppb to about 12 ppb of a pre-gelatinized crosslinked amylopectin starch which comprises adding to the aqueous fluid a particulate sized magnesium carbonate bridging agent having a median particle size from about 2 micrometers to about 10 micrometers, wherein the magnesium carbonate bridging agent is mixed with a particulate sized calcium carbonate bridging agent having a median particle size from about 2 micrometers to about 10 micrometers wherein the resulting mixed bridging agent contains from about 30% to about 100% by weight of the sized magnesium carbonate and from about 0% by weight to about 70% by weight of the sized calcium carbonate particles.

Still another object of the invention is to provide a well drilling and servicing comprising an aqueous brine containing at least 1.2 equivalents per liter of a water soluble divalent cation salt, from about 5 ppb to about 12 ppb of a pre-gelatinized crosslinked amylopectin starch, and a particulate sized magnesium carbonate bridging agent having a median particle size from about 2 micrometers to 10 about micrometers.

Yet another object of the invention is to provide a well drilling and servicing fluid comprising an aqueous brine containing at least 1.2 equivalents per liter of a water soluble divalent cation salt, from about 5 ppb to about 12 ppb of a pre-gelatinized crosslinked amylopectin starch, and a particulate sized magnesium carbonate bridging agent having a median particle size from about 2 micrometers to about 10 micrometers, wherein the magnesium carbonate bridging agent is mixed with a particulate sized calcium carbonate bridging agent having a median particle size from about 2 micrometers to about 10 micrometers wherein the resulting mixed bridging agent contains from about 30% to about 100% by weight of the sized magnesium carbonate and from about 0% by weight to about 70% by weight of the sized calcium carbonate particles.

Other objects, features and embodiments of the invention are disclosed in the following description of the invention and appended claims.

While the invention is susceptible to various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DETAILED DESCRIPTION OF THE INVENTION

The present invention is based on the discovery that the LSRV and STI of fluids containing certain dense brines and a starch derivative which imparts suspension characteristics and fluid loss control characteristics to the brines can be increased by adding thereto a sized magnesium carbonate bridging agent or a mixture of sized calcium carbonate and sized magnesium carbonate.

The brines useful in the compositions and processes of the invention contain at least 1.2 equivalents per liter of one or more water soluble divalent cation salts. Preferred divalent cations are the alkaline earth metal salts and/or zinc salts. The preferred anion is a halide, most preferably chloride and/or bromide. Most preferred divalent cations are selected from the group consisting of calcium, magnesium, zinc, and mixtures thereof. Exemplary most preferred salts are selected from the group consisting of calcium chloride, calcium bromide, magnesium chloride, magnesium bromide, zinc chloride, zinc bromide and mixtures thereof Other divalent cation water soluble salts may be present in the brine.

The preferred brines have a density of at least about 10.0 ppg, most preferably from about 10.0 ppg to about 17.5 ppg.

The starch derivative which imparts suspension characteristics and fluid loss control characteristics to the fluids of the invention is a pre-gelatinized amylopectin starch which has been crosslinked.

The chemistry of starch and the preparation of a multitude of derivatives thereof is well known. A book entitled "Modified Starches: Properties and Uses," by O. B. Wurzburg, 1986 (CRC Press, Inc., Boca Raton, Fla., U.S.A.) is an excellent source for information in the preparation of modified starches. In regards to the preparation of the crosslinked starches of this invention, the chapter entitled "Crosslinked Starches" is particularly pertinent.

Representative crosslinking materials are epichlorohydrin and other epihalohydrins, formaldehyde, phosphorous oxychloride, trimetaphosphate, dialdehydes, vinyl sulfone, diepoxides, diisocyanates, bis(hydroxymethyl) ethylene urea, and the like. The preferred crosslinking compound is epichlorohydrin.

Crosslinking of the starch results in an increase in the molecular weight of the starch and an increase in the viscosity of aqueous dispersions of the starch.

The reaction conditions used in making crosslinked starches vary widely depending upon the specific bi-or polyfunctional reagent used for the crosslinking. In general, most of the reactions are run on aqueous suspensions of starch at temperatures ranging from room temperature up to about 50° C. Often an alkali such as sodium hydroxide is used to promote reaction. The reactions are normally run under neutral to fairly alkaline conditions, but below the level which will peptize or swell the starch. If the crosslinking reaction is run in an aqueous suspension of starch, when the desired level of crosslinking (usually as measured by some type of viscosity or rheology test) is reached, the starch suspension is neutralized and the starch is filtered and washed to remove salts, any unreacted reagent, and other impurities produced by side reactions of the crosslking reagent with water. Konigsberg U.S. Pat. No. 2,500,950 discloses the crosslinking of starch with epoxyhalogen compounds such as epichlorohydrin. If desired, the starch can be suspended in non-aqueous liquids or aqueous solutions containing water soluble organic liquids during crossliking. See for example Kesler et al. U.S. Pat. No. 2,845,417, incorporated herein by reference.

It is preferred that the amylopectin starch for use in the present invention be crosslinked with epichlorohydrin in a basic aqueous starch suspension at a temperature and for a period of time such that the Brabander viscosity of the suspension is within about 25% to about 60% of the maximum attainable viscosity, preferably from about 25% to less than about 50% of the maximum attainable viscosity. The viscosity will vary by the amount of crosslinking and the test conditions, i.e., temperature, concentrations, etc. A viscosity peak indicates maximum crosslining. When the desired viscosity is reached, the crosslinking reaction is terminated. A Brabender Viscometer is a standard viscometer readily available on the open market and well known to those skilled in the art.

As indicated, the crosslinked amylopectin starch of this invention is pre-gelatinized. The term "gelatinization" is well known in the art and is generally used to describe the swelling and hydration of starches. The term "pregelatinized" indicates that the crosslinked amylopectin has been gelatinized such that the crosslinked amylopectin does not undergo gelatinization upon adding it to the brines of the present invention.

The crosslinked amylopectin is normally gelatinized by heating the crosslinked amylopectin at a temperature above the gelatinization temperature, such as during drying of the crosslinked starch slurry.

The pre-gelatinized crosslinked amylopectin for use in the present invention is preferably derived from a waxy starch, preferably waxy corn (maize) starch. As is known, waxy starches are virtually all amylopectin whereas common starches contain both amylose and amylopectin molecules. For the purposes of disclosing and claiming this invention, the amylopectin contains less than about 10% by weight amylose, preferably not more than about 5% amylose and most preferably less than 1% amylose. Potato starch is another source of amylopectin.

The brines may contain other compatible water soluble salts therein. The term "compatible" as used herein in regards to the present invention refers to a salt which does not result in precipitate formation in the brine and/or which does not prevent the disclosed pre-gelatinized crosslinked amylopectin starch from providing the brines with the characteristics set forth herein.

The fluids of this invention may contain other functional additives to impart specific properties to the fluids. Thus the fluids may contain weight materials (which may function as bridging agents in an appropriate particle size range), corrosion inhibitors, anti-oxidants, oxygen scavengers, reducing agents, supplemental fluid loss control additives, supplemental viscosifiers, and the like.

The fluids of this invention must have a bridging agent incorporated therein. Bridging agents are solid, particulate, acid soluble materials the particles of which have been sized to have a particle size distribution sufficient to seal off the pores of the formations contacted by the well drilling and servicing fluid as is well known in the art.

We have now found that sized magnesium carbonate or mixtures of sized magnesium carbonate and sized calcium carbonate increase the low shear rate viscosity of the fluids, and hence the suspension characteristics of the fluids, without adversely increasing the high shear rate viscosity of the fluids. The median particle size ($D_{50}$) of the magnesium carbonate is from about 2 micrometers to about 10 micrometers. The median particle size ($D_{50}$) of the calcium carbonate is from about 2 micrometers to about 10 micrometers. The weight ratio of the sized calcium carbonate to the sized magnesium carbonate is from about 0/100 to about 70/30 micrometers, i.e., from about 0/1 to about 2.33/1.

The concentration of the bridging agents will be sufficient that, together with the concentration of the starch derivative, the fluids exhibit a LSRV greater than about 10,000 cp, preferably greater than about 20,000 cp, an apparent viscosity at 1022 $sec^{-1}$ in the range from about 15 cp to about 70 cp, and a fluid loss less than about 10 milliliters as measured at 185° F. and 250 psi differential pressure across a 5 micron disk for 30 minutes. Generally the concentration of the bridging agents will be from about 5 ppb to about 50 ppb, preferably from about 10 ppb to about 30 ppb.

The concentration of the starch derivative must be sufficient to provide the fluid with the following characteristics: (a) a low shear rate viscosity less than about 10,000 centipoise in the absence of the bridging agent or other additive which increases the LSRV; (b) a high shear rate apparent viscosity at 1022 $sec^{-1}$ in the range from about 15 to about 70 centipoise measured at 120° F.; (c) a fluid loss less than about 10 milliliters as measured at 185° F. and 250 psi differential pressure across a 5 micron disc for 30 minutes; and (d) anti-settling characteristics as exhibited upon static aging the fluid for 16 hours at 185° F. Generally, the concentration of the starch derivative will be from about 5 ppb to about 12 ppb, preferably from about 6 ppb to about 11 ppb, and most preferably from about 7 ppb to about 10 ppb.

After static aging the fluids in sealed pint jars, any separation or syneresis is noted by measuring the depth of separation. For purposes of this invention, the fluids of the invention exhibit no more than ¼ inch separation which is about 10% by volume. The settling characteristics of the aged fluids is then determined by inserting a spatula carefully into the fluids and observing if any solids had separated from the fluid. For purposes of this invention, the fluids exhibit no settling of solids.

It is a novel feature of the invention that the starch derivative imparts excellent suspension characteristics to the fluids at the low viscosities imparted to the fluids. This is in direct contrast with fluids containing water soluble polymer viscosifiers, such as biopolymers, such as xanthan gum, scleroglucan gum, succinoglycan gum, and the like, in the dense brines used in the fluids of this invention.

It is preferred that the fluids of the invention do not contain any polymeric viscosifiers, such as biopolymers, i.e., the preferred fluids are biopolymer free.

Without being limited thereby, we believe that the buoyancy of the brines contributes to the suspension characteristics of the brines. Thus as the density of the dense brines increases, less viscosity development by the starch derivative is necessary for the excellent suspension characteristics observed. This has not been previously known. Indeed, prior art fluids as exemplified by the patents disclosed hereinbefore indicate that the fluids contain a biopolymer or amorphous silica viscosifier and suspending agent and generally a starch or derivative thereof as a filtration control additive.

The fluids of the invention may be prepared and the method of the invention practiced, by mixing the dense divalent cation-containing brine as set forth herein with the starch derivative, and the bridging agent, and any optional additives as disclosed herein.

The fluids of the invention are useful in various petroleum recovery operations such as well drilling, including drilling into hydrocarbon-containing formations, completion, workover and the like all as are well known in the art. Specifically the fluids of the invention are useful in drilling a well wherein the drilling fluid is circulated within a borehole being drilled as drilling proceeds, and in well completion and workover methods wherein a subterranean formation is contacted with an aqueous fluid to form a bridge and seal on the formation, all as are well known in the art.

The low shear rate viscosity (LSRV) for purposes of this invention is obtained using a Brookfield Model LVTDV-1 viscometer having a number 1 or 2 spindle at 0.3 revolutions per minute (shear rate of 0.0636 $sec^{-1}$). The fluid loss characteristics of the fluids are obtained by a modified API filtration test. Thus to an API high temperature filtration cell with removable end cages is added a 5 micron disk (i.e., an aluminum oxide (Aloxite™) ceramic disk having 5 micron pore throats, from 600 to 750 md permeability, which is 2.5 inches in diameter and 0.25 inch in depth) saturated with water. The fluid to be tested is poured along the inside edge of the filtration cell. The filtration test is then conducted for 30 minutes at the desired temperature of 185° F. under a pressure differential of 250 pounds per square inch supplied by nitrogen. The spurt loss is measured as the amount of fluid expelled from the filtration cell until the flow of fluid is reduced to drops. The fluid loss is measured as the total amount of fluid collected in 30 minutes.

The apparent viscosity in centipoise at 1022 $sec^{-1}$ is obtained utilizing a Fann 35 Viscometer at 600 rpm by multiplying the Fann dial reading by 0.5.

The median particle size ($D_{50}$) of the magnesium carbonate and calcium carbonate are determined with a Malvern Instruments' MASTERSIZER particle size analyzer.

In order to more completely describe the invention, the following non-limiting examples are given. In these examples and this specification, the following abbreviations may be used: API=American Petroleum Institute; XLAPS= the pre-gelatinized epichlorohydrin crosslinked amylopectin starch derivative of this invention which has been crosslinked to the extent that the viscosity of a basic aqueous amylopectin starch suspension undergoing crosslinking is within about 25% about 60% of the maximum viscosity which can be obtained; LSRV=Brookfield low shear rate viscosity at 0.03 revolutions per minute; 0.0636 $sec^{-1}$, in centipoise; high shear rate viscosity=apparent Fann viscosity at 1022 $sec^{-1}$ (600 rpm) in centipoise=$AV_{600}$; sec=second (s); ppg=pounds per gallon; ppb=pounds per 42 gallon barrel; ° F. degrees Fahrenheit; ml=milliliters; min=minutes; cp=centipoise; rpm=revolutions per minute; in=inches.

EXAMPLES 1–8

Alkaline aqueous fluids were prepared by dispersing 8 ppb pre-gelatinized, epichlorohydrin crosslinked amylopectin starch in an aqueous calcium bromide containing 0.781 bbl of a 14.2 ppg $CaBr_2$ brine and 0.188 bbl of fresh water. 0.25 ppb of magnesium oxide buffer was added to ensure an alkaline pH. Thereafter magnesium carbonate having the median ($D_{50}$) particle size set forth in Table 1. Calcium carbonate having the median ($D_{50}$) particle size set forth in Table 1 was added to some of the fluids in the amount set forth in Table 1. A fluid, designated C, containing only a $CaCO_3$ bridging agent was also prepared for comparison. The Theological properties obtained on these fluids are set forth in Table 1.

The data indicate that the magnesium carbonate increased the low shear rate viscosity and shear thinning index of the fluids throughout the median particle size range from about 2 micrometers to about 10 micrometers. The mixures of magnesium carbonate and calcium carbonate increased the LSRV and STI for $MgCO_3$ concentrations from about 30% to about 100% and $CaCO_3$ concentrations from about 0% to about 70%, wherein the percentages are based on the combined weight of the $MgCO_3$ and $CaCO_3$.

TABLE 1

| Fluid | C | 1 | 2 | 3 | 4 | 5 | 6 | 7 | 8 |
|---|---|---|---|---|---|---|---|---|---|
| Bridging Agent | | | | | | | | | |
| $MgCO_3$, ppb | 0 | 26 | 26 | 26 | 26 | 20 | 9 | 9 | 6 |
| $MgCO_3$, $D_{50}$, μm | — | 9.2 | 5.6 | 3.8 | 2.0 | 9.2 | 9.2 | 9.2 | 9.2 |

TABLE 1-continued

| Fluid | C | 1 | 2 | 3 | 4 | 5 | 6 | 7 | 8 |
|---|---|---|---|---|---|---|---|---|---|
| $CaCO_3$, ppb | 26 | 0 | 0 | 0 | 0 | 6 | 17 | 17 | 20 |
| $CaCO_3$, $D_{50}$, μm | 5.8 | — | — | — | — | 5.8 | 2.4 | 6.9 | 5.8 |
| $MgCO_3$, %* | 0 | 100 | 100 | 100 | 100 | 76.7 | 34.6 | 34.6 | 23.1 |
| $CaCO_3$, %* | 100 | 0 | 0 | 0 | 0 | 23.3 | 65.4 | 65.4 | 76.9 |
| INITIAL PROPERTIES | | | | | | | | | |
| LSRV, cp (×10$^{-3}$) | 28.2 | 61.5 | 32.7 | 33.5 | 57.5 | 41.6 | 61.5 | 69.0 | 14.6 |
| $AV_{600}$, cp | 27.5 | 27.5 | 27 | 26 | 27 | 30.5 | 30.5 | 25.0 | 22.5 |
| STI | 1025 | 2236 | 1211 | 1288 | 2130 | 1364 | 2016 | 2760 | 649 |
| pH | — | 8.67 | 8.51 | 8.45 | 8.46 | 8.48 | — | — | 8.49 |

*= by weight of combined bridging agent

What is claimed is:

1. A method of increasing the low shear rate viscosity and the shear thinning index of an aqueous fluid containing at least 1.2 equivalents per liter of a water soluble divalent cation salt and from about 5 ppb to about 12 ppb of a pre-gelatinized crosslinked amylopectin starch which comprises adding to the aqueous fluid a particulate sized magnesium carbonate bridging agent having a median particle size from about 2 micrometers to about 10 micrometers.

2. The method of claim 1 wherein the concentration of the magnesium carbonate bridging agent is sufficient to raise the low shear rate viscosity of the fluid above about 10,000 centipoise while maintaining the 600 rpm apparent viscosity of the fluid less than about 70 centipoise.

3. The method of claim 2 wherein the concentration of the bridging agent is from about 10 ppb to about 50 ppb.

4. The method of claim 1 wherein the magnesium carbonate bridging agent is mixed with a particulate sized calcium carbonate bridging agent having a median particle size from about 2 micrometers to about 10 micrometers wherein the resulting mixed bridging agent contains from about 30% to about 100% by weight of the sized magnesium carbonate and from about 0% by weight to about 70% by weight of the sized calcium carbonate particles.

5. The method of claim 4 wherein the concentration of the mixed bridging agent is sufficient to raise the low shear rate viscosity of the fluid above about 10,000 centipoise while maintaining the 600 rpm apparent viscosity of the fluid less than about 70 centipoise.

6. The method of claim 5 wherein the concentration of the mixed bridging agent is from about 10 ppb to about 50 ppb.

7. The method of claim 1 wherein the aqueous fluid additionally contains an additive selected from the group consisting of magnesium oxide, dipotassium hydrogen phosphate, and mixtures thereof, in an amount sufficient to further increase the low shear rate viscosity of the fluids while maintaining the 600 rpm apparent viscosity less than about 70 centipoise.

8. The method of claim 2 wherein the aqueous fluid additionally contains an additive selected from the group consisting of magnesium oxide, dipotassium hydrogen phosphate, and mixtures thereof, in an amount sufficient to further increase the low shear rate viscosity of the fluids while maintaining the 600 rpm apparent viscosity less than about 70 centipoise.

9. The method of claim 3 wherein the aqueous fluid additionally contains an additive selected from the group consisting of magnesium oxide, dipotassium hydrogen phosphate, and mixtures thereof, in an amount sufficient to further increase the low shear rate viscosity of the fluids while maintaining the 600 rpm apparent viscosity less than about 70 centipoise.

10. The method of claim 4 wherein the aqueous fluid additionally contains an additive selected from the group consisting of magnesium oxide, dipotassium hydrogen phosphate, and mixtures thereof, in an amount sufficient to further increase the low shear rate viscosity of the fluids while maintaining the 600 rpm apparent viscosity less than about 70 centipoise.

11. The method of claim 5 wherein the aqueous fluid additionally contains an additive selected from the group consisting of magnesium oxide, dipotassium hydrogen phosphate, and mixtures thereof in an amount sufficient to further increase the low shear rate viscosity of the fluids while maintaining the 600 rpm apparent viscosity less than about 70 centipoise.

12. The method of claim 6 wherein the aqueous fluid additionally contains an additive selected from the group consisting of magnesium oxide, dipotassium hydrogen phosphate, and mixtures thereof, in an amount sufficient to further increase the low shear rate viscosity of the fluids while maintaining the 600 rpm apparent viscosity less than about 70 centipoise.

13. The method of claim 1 wherein the water soluble divalent cation salt is a calcium salt.

14. The method of claim 2 wherein the water soluble divalent cation salt is a calcium salt.

15. The method of claim 3 wherein the water soluble divalent cation salt is a calcium salt.

16. The method of claim 4 wherein the water soluble divalent cation salt is a calcium salt.

17. The method of claim 5 wherein the water soluble divalent cation salt is a calcium salt.

18. The method of claim 6 the water soluble divalent cation salt is a calcium salt.

19. The method of claim 7 the water soluble divalent cation salt is a calcium salt.

20. The method of claim 8 the water soluble divalent cation salt is a calcium salt.

21. The method of claim 9 the water soluble divalent cation salt is a calcium salt.

22. The method of claim 10 the water soluble divalent cation salt is a calcium salt.

23. The method of claim 11 the water soluble divalent cation salt is a calcium salt.

24. The method of claim 12 the water soluble divalent cation salt is a calcium salt.

25. The method of claim 1 wherein the fluid has a density from about 10 ppg to about 17.5 ppg.

26. The method of claim 2 wherein the fluid has a density from about 10 ppg to about 17.5 ppg.

27. The method of claim 3 wherein the fluid has a density from about 10 ppg to about 17.5 ppg.

28. The method of claim 4 wherein the fluid has a density from about 10 ppg to about 17.5 ppg.

29. The method of claim 5 wherein the fluid has a density from about 10 ppg to about 17.5 ppg.

30. The method of claim 6 wherein the fluid has a density from about 10 ppg to about 17.5 ppg.

31. The method of claim 7 wherein the fluid has a density from about 10 ppg to about 17.5 ppg.

32. The method of claim 8 wherein the fluid has a density from about 10 ppg to about 17.5 ppg.

33. The method of claim 9 wherein the fluid has a density from about 10 ppg to about 17.5 ppg.

34. The method of claim 10 wherein the fluid has a density from about 10 ppg to about 17.5 ppg.

35. The method of claim 11 wherein the fluid has a density from about 10 ppg to about 17.5 ppg.

36. The method of claim 12 wherein the fluid has a density from about 10 ppg to about 17.5 ppg.

37. A well drilling and servicing fluid comprising an aqueous brine containing at least 1.2 equivalents per liter of a water soluble divalent cation salt, from about 5 ppb to about 12 ppb of a pre-gelatinized crosslinked amylopectin starch, and a particulate sized magnesium carbonate bridging agent having a median particle size from about 2 micrometers to about 10 micrometers.

38. The fluid of claim 37 wherein the concentration of the magnesium carbonate bridging agent is sufficient to raise the low shear rate viscosity of the fluid above about 10,000 centipoise while maintaining the 600 rpm apparent viscosity of the fluid less than about 70 centipoise.

39. The fluid of claim 38 wherein the concentration of the bridging agent is from about 10 ppb to about 50 ppb.

40. The fluid of claim 37 wherein the magnesium carbonate bridging agent is mixed with a particulate sized calcium carbonate bridging agent having a median particle size from about 2 micrometers to about 10 micrometers wherein the resulting mixed bridging agent contains from about 30% to about 100% by weight of the sized magnesium carbonate and from about 0% by weight to about 70% by weight of the sized calcium carbonate particles.

41. The fluid of claim 40 wherein the concentration of the mixed bridging agent is sufficient to raise the low shear rate viscosity of the fluid above about 10,000 centipoise while maintaining the 600 rpm apparent viscosity of the fluid less than about 70 centipoise.

42. The fluid of claim 41 wherein the concentration of the mixed bridging agent is from about 10 ppb to about 50 ppb.

43. The fluid of claim 37 wherein the aqueous fluid additionally contains an additive selected from the group consisting of magnesium oxide, dipotassium hydrogen phosphate, and mixtures thereof, in an amount sufficient to further increase the low shear rate viscosity of the fluids while maintaining the 600 rpm apparent viscosity less than about 70 centipoise.

44. The fluid of claim 38 wherein the aqueous fluid additionally contains an additive selected from the group consisting of magnesium oxide, dipotassium hydrogen phosphate, and mixtures thereof, in an amount sufficient to further increase the low shear rate viscosity of the fluids while maintaining the 600 rpm apparent viscosity less than about 70 centipoise.

45. The fluid of claim 39 wherein the aqueous fluid additionally contains an additive selected from the group consisting of magnesium oxide, dipotassium hydrogen phosphate, and mixtures thereof, in an amount sufficient to further increase the low shear rate viscosity of the fluids while maintaining the 600 rpm apparent viscosity less than about 70 centipoise.

46. The fluid of claim 40 wherein the aqueous fluid additionally contains an additive selected from the group consisting of magnesium oxide, dipotassium hydrogen phosphate, and mixtures thereof, in an amount sufficient to further increase the low shear rate viscosity of the fluids while maintaining the 600 rpm apparent viscosity less than about 70 centipoise.

47. The fluid of claim 41 wherein the aqueous fluid additionally contains an additive selected from the group consisting of magnesium oxide, dipotassium hydrogen phosphate, and mixtures thereof, in an amount sufficient to further increase the low shear rate viscosity of the fluids while maintaining the 600 rpm apparent viscosity less than about 70 centipoise.

48. The fluid of claim 42 wherein the aqueous fluid additionally contains an additive selected from the group consisting of magnesium oxide, dipotassium hydrogen phosphate, and mixtures thereof, in an amount sufficient to further increase the low shear rate viscosity of the fluids while maintaining the 600 rpm apparent viscosity less than about 70 centipoise.

49. The fluid of claim 37 wherein the water soluble divalent cation salt is a calcium salt.

50. The fluid of claim 38 wherein the water soluble divalent cation salt is a calcium salt.

51. The fluid of claim 39 wherein the water soluble divalent cation salt is a calcium salt.

52. The fluid of claim 40 wherein the water soluble divalent cation salt is a calcium salt.

53. The fluid of claim 41 wherein the water soluble divalent cation salt is a calcium salt.

54. The fluid of claim 42 wherein the water soluble divalent cation salt is a calcium salt.

55. The fluid of claim 43 wherein the water soluble divalent cation salt is a calcium salt.

56. The fluid of claim 44 wherein the water soluble divalent cation salt is a calcium salt.

57. The fluid of claim 45 wherein the water soluble divalent cation salt is a calcium salt.

58. The fluid of claim 46 wherein the water soluble divalent cation salt is a calcium salt.

59. The fluid of claim 47 wherein the water soluble divalent cation salt is a calcium salt.

60. The fluid of claim 48 wherein the water soluble divalent cation salt is a calcium salt.

61. The fluid of claim 37 wherein the fluid has a density from about 10 ppg to about 17.5 ppg.

62. The fluid of claim 38 wherein the fluid has a density from about 10 ppg to about 17.5 ppg.

63. The fluid of claim 39 wherein the fluid has a density from about 10 ppg to about 17.5 ppg.

64. The fluid of claim 40 wherein the fluid has a density from about 10 ppg to about 17.5 ppg.

65. The fluid of claim 41 wherein the fluid has a density from about 10 ppg to about 17.5 ppg.

66. The fluid of claim 42 wherein the fluid has a density from about 10 ppg to about 17.5 ppg.

67. The fluid of claim 43 wherein the fluid has a density from about 10 ppg to about 17.5 ppg.

68. The fluid of claim 44 wherein the fluid has a density from about 10 ppg to about 17.5 ppg.

69. The fluid of claim 45 wherein the fluid has a density from about 10 ppg to about 17.5 ppg.

70. The fluid of claim 46 wherein the fluid has a density from about 10 ppg to about 17.5 ppg.

71. The fluid of claim 47 wherein the fluid has a density from about 10 ppg to about 17.5 ppg.

72. The fluid of claim 48 wherein the fluid has a density from about 10 ppg to about 17.5 ppg.

\* \* \* \* \*